(12) United States Patent
Kettunen

(10) Patent No.: US 12,466,106 B2
(45) Date of Patent: Nov. 11, 2025

(54) METHOD FOR THE MANUFACTURE OF PRODUCTS MADE FROM FIBROUS MATERIAL

(71) Applicant: Fiberdom Oy, Helsinki (FI)

(72) Inventor: Timo Kettunen, Kuusjärvi (FI)

(73) Assignee: FIBERDOM OY, Helsinki (FI)

( * ) Notice: Subject to any disclaimer, the term of this patent is extended or adjusted under 35 U.S.C. 154(b) by 365 days.

(21) Appl. No.: 17/630,229

(22) PCT Filed: Jul. 30, 2020

(86) PCT No.: PCT/FI2020/050511
§ 371 (c)(1),
(2) Date: Jan. 26, 2022

(87) PCT Pub. No.: WO2021/023913
PCT Pub. Date: Feb. 11, 2021

(65) Prior Publication Data
US 2022/0273124 A1    Sep. 1, 2022

(30) Foreign Application Priority Data

Aug. 2, 2019  (FI) ...................................... 20195657

(51) Int. Cl.
*B27N 5/00* (2006.01)
*A47G 19/03* (2006.01)
(Continued)

(52) U.S. Cl.
CPC .............. *B27N 5/00* (2013.01); *A47G 19/03* (2013.01); *A47G 21/00* (2013.01); *A47G 21/02* (2013.01);
(Continued)

(58) Field of Classification Search
CPC . B27N 3/08; B27N 3/12; B27N 3/002; B27N 3/18; B27N 3/26; B27N 5/00
See application file for complete search history.

(56) References Cited

U.S. PATENT DOCUMENTS 2,095,389 A    10/1937  Henry
2,291,471 A *   7/1942  Hopkins .................. B27M 3/24
                                                          144/380
(Continued)

FOREIGN PATENT DOCUMENTS

FI           82637 C      4/1991
KR      100407287 B1     11/2003
(Continued)

OTHER PUBLICATIONS

Finnish Search Report issued in corresponding Finnish Patent Application No. 20195657 dated Jan. 15, 2020. (1 page).
(Continued)

*Primary Examiner* — Benjamin A Schiffman
(74) *Attorney, Agent, or Firm* — Boone IP Law, PLLC

(57) ABSTRACT

A method for manufacturing a product, such a disposable cutlery, manufactured of a fibre material, includes feeding fibrous material as a material flow, binding the fibres into a coherent profile, and molding the cross-sectional profile of the profile into a blank with a desired cross-sectional profile using at least one roller pair or drum pair. The method further includes cutting products of the desired shape from the molded blank by aligning a cutting geometry of the products at the desired place on the blank.

9 Claims, 4 Drawing Sheets

(51) Int. Cl.
| | |
|---|---|
| *A47G 21/00* | (2006.01) |
| *A47G 21/02* | (2006.01) |
| *B26B 9/00* | (2006.01) |
| *B27N 1/00* | (2006.01) |
| *B27N 7/00* | (2006.01) |
| *B28B 1/52* | (2006.01) |
| *B29C 43/00* | (2006.01) |
| *B29C 43/02* | (2006.01) |
| *B29C 43/08* | (2006.01) |
| *B29C 43/46* | (2006.01) |
| *B29C 65/00* | (2006.01) |

(52) U.S. Cl.
CPC ............... *B26B 9/00* (2013.01); *B27N 1/00* (2013.01); *B27N 7/00* (2013.01); *B28B 1/52* (2013.01); *B29C 43/003* (2013.01); *B29C 43/02* (2013.01); *B29C 43/08* (2013.01); *B29C 43/46* (2013.01); *B29C 66/8341* (2013.01)

(56) References Cited

U.S. PATENT DOCUMENTS

| | | | |
|---|---|---|---|
| 4,925,512 A | 5/1990 | Briand | |
| 5,215,696 A * | 6/1993 | Weibel | B27N 3/14 |
| | | | 264/517 |
| 5,508,072 A * | 4/1996 | Andersen | B29C 43/003 |
| | | | 524/498 |
| 5,720,913 A | 2/1998 | Andersen et al. | |
| 5,756,024 A * | 5/1998 | Huang | B65D 65/466 |
| | | | 264/129 |
| 5,817,381 A | 10/1998 | Chen | |
| 6,568,932 B1 * | 5/2003 | Murai | B27N 5/00 |
| | | | 264/297.6 |
| 7,955,428 B2 * | 6/2011 | Aoki | A47G 19/00 |
| | | | 106/126.3 |
| 8,079,390 B2 * | 12/2011 | Bigsby | B27D 1/08 |
| | | | 144/359 |
| 8,317,671 B1 * | 11/2012 | Zoeckler | B65D 5/48024 |
| | | | 493/379 |
| 11,020,883 B2 * | 6/2021 | Larsson | B27N 5/02 |
| 11,370,894 B2 * | 6/2022 | Mayes | C08J 9/0066 |
| 2008/0178966 A1 | 7/2008 | Bigsby et al. | |
| 2009/0126204 A1 | 5/2009 | Wagner et al. | |
| 2010/0236972 A1 | 9/2010 | Aoki et al. | |
| 2011/0253289 A1 | 10/2011 | Shepard | |
| 2018/0265665 A1 | 9/2018 | Mayes et al. | |
| 2022/0056623 A1 * | 2/2022 | Hanley | B27N 1/00 |

FOREIGN PATENT DOCUMENTS

| | | | |
|---|---|---|---|
| WO | 9412328 A1 | 6/1994 | |
| WO | 2009063137 A1 | 5/2009 | |
| WO | 2015064418 A1 | 5/2015 | |
| WO | WO-2017160218 A1 * | 9/2017 | B27N 3/04 |

OTHER PUBLICATIONS

International Preliminary Report on Patentability (PCT/IPEA/409) issued in corresponding International Patent Application No. PCT/FI2020/050511 dated Aug. 18, 2021. (16 pages).

International Search Report (PCT/ISA/210) and Written Opinion (PCT/ISA/237) mailed on Nov. 4, 2020, by the Finnish Patent and Registration Office as the International Searching Authority for International Application No. PCT/FI2020/050511. (22 pages).

Third Finnish Office Action, mailed on Oct. 27, 2023 by the Finnish Patent and Registration Office for Finnish Application No. 20195657, with English translation (16 pages).

Extended European Search Report with English translation mailed on Oct. 23, 2023 by the European Patent Office for European Application No. 20851134.5, (six pages).

* cited by examiner

METHOD FOR THE MANUFACTURE OF PRODUCTS MADE FROM FIBROUS MATERIAL

FIELD

The present disclosure relates to a method for manufacturing products as well as to disposable products made by the method. The main range of use of the disposable products according to the disclosure is cutlery and table utensils, but the use of the method is not limited thereto.

The disclosure also describes alternative feed solutions and embodiments of the manufacturing material, relating to the implementation of the disclosure, as well as additional details.

BACKGROUND

The main manufacturing material of disposable cutlery, such as forks, knives and spoons, currently used and on the market is plastics, and the dominant method of manufacturing is the injection moulding technology or moulding manufacturing as various applications.

As concerns disposable cutlery, patent literature also knows a few plastic-free manufacturing materials, or those containing a small portion of plastics, only, as well as manufacturing methods making use of them, to be described below as examples. The Finnish utility model publication, registration no. 7815 (see also PCT/FI2008/050657) describes a solution where the portion of wood material is high, and the manufacturing method is injection moulding.

Application publication US2018/0265665A1 describes a solution relating to material technology, in which the portion of cellulose fibres is large. The manufacturing technique referred to is injection moulding or extruding. The solution relating to the material technology is likely to be applicable to disposable cutlery, too.

Application publication US2010/0236972A1 discloses a material whose main raw materials are starch and cellulose fibres, the claims referring to the manufacture of cutlery, among other things. The manufacturing method the publication puts forth is press moulding followed by heat treating for the product.

Application publication US2009/0126204A1 discloses a manufacturing process for products made of a crop-based material (straw material), whose manufacturing method is the moulding technique.

Furthermore, it is known to manufacture disposable cutlery from wood material, among other things, one example of which is the application publication US2008/0178966A1 in which a plywood-like raw material blank is pressed in a mould into the desired shape.

It has been possible, to some extent, to mix wood-based fibre materials and those processed from other products of the plant kingdom into plastic-based manufacturing material. As a typical manufacturing material, wood-fibre composite is known, which is used by the injection moulding technique to manufacture, for example, disposable tableware for camping and other such uses. The goal has been to mix wood-based fibres, or fibres such as cellulose fibres from other products of the plant kingdom, into the manufacturing process of disposable cutlery, too, but the injection moulding technology sets clear constraints on the relative portion of fibres in the manufacturing material. In the injection moulding technology, a plastic-based material brought to a temperature where it is a liquid is led at high pressure to narrow passages and canals in a mould, which requires that the material exhibits a good ability to flow. The fibres reduce the ability of the material to flow, and the filling of the mould becomes a problem for products comprising thin structures, as is the case with disposable cutlery. The maximum amount of fibres in connection with injection moulding of thin structures is 60 percent by weight. An additional drawback of the injection moulding technology is the high manufacturing cost of the moulds used in it.

A major problem globally, and specifically highlighted by the European Union, is the use of disposable plastic products from the viewpoint of environmental issues, for which restrictions are sought in the form of distinct bans, to take effect in the forthcoming years. The list of banned items include, specifically, disposable cutlery for which the portion of plastic in the raw material will be restricted, at least, or plastic will be banned altogether as a component in raw material for disposable, high-volume products.

SUMMARY

The new manufacturing method according to the present disclosure allows the aforementioned problems to be eliminated and the manufacture of plastic-free products, such as disposable products, in which the portion of natural fibres, such as cellulose fibres, exceeds 95 percent by weight in finished products. The fibres can be made to bind into each other at a roll forming step, at a high compression pressure. As a binding agent for the fibres, a small amount of various types of binding agents may also be used, typically natural materials such as starch or lignin. The binding agent may be mixed with the fibre material either in advance or in connection with the manufacturing process as part of feeding in material.

The disclosure relates to a method for manufacturing a product made of a fibre material, such as disposable cutlery, the method comprising the steps of feeding fibrous material as a material flow to a roll forming step in which roll forming step the fibres are bound as a coherent profile, and moulding the cross-sectional profile of the profile into a blank having the desired cross sectional profile by means of at least one roller pair or drum pair, and cutting products of a desired shape from the blank moulded at the roll forming step by directing a cutting geometry of the products in a desired location on the blank. The disclosure also relates to disposable products manufactured by the method.

In the method according to the disclosure, the manufacturing materials of products may be fed to the roll forming step either as a powdery material, as a moist mass, as band-type material fed from a roll, or as a material flow fed in sheet form. The manufacturing material for products may also be fed to the roll forming step as a combination of several material bands, which are bound into each other at the roll forming step. The material bands combined at the roll forming step may differ from each other as concerns the properties of the band materials and, in addition, their physical dimensions. The sheet-like, powdery, or moist mass material may also be fed to the first pressing stage, or stages, supported by a belt led through a nip of the roller pairs. The band-like or sheet-like materials may also be fed to the roll forming step as a multi-layer structure whereby the different material layers may differ in property from each other.

The material flow fed to the roll forming step may be thermally or chemically preprocessed as a step before roll forming, whereby the binding and formability of the fibres are improved. Thermal processing may also be continued at the roll forming step and following it.

As an application, the material flow to the roll forming step may consist of one or more wide bands in addition to which thin material bands are fed in connection with the wide bands to the desired locations of the cross-section of the material flow, whereby the profile of the cross-section of the material flow differs from a profile of equal thickness in the desired manner. The profile of the cross-section of the material fed to the roll forming step may also be implemented as a desired profile differing from a profile of equal thickness in the form of a material band pre-manufactured in a powdery, mass-like or the desired cross-sectional form of the band, whereby the substance thickness or alternatively material density or strength properties of the profile at the roll forming step may be controlled to comply as desired with the requirements of the products to be manufactured, cut from the profile.

The roll forming step of the method according to the disclosure comprises pressing the material flow between one or more successive roller pairs or drum pairs, manufactured in the desired form, to the desired material density and the desired cross-sectional profile and the desired substance thickness at different locations of the cross-section. In roll forming that comprises a plurality of successive roller pairs or drum pairs, the mutual speed difference of the roller pairs is adjusted by a prior art technology to control the potential longitudinal elongation of the blank being manufactured.

The roll forming step may also be implemented as so-called hot pressing, whereby the rollers or drums used in roll forming may be heated and kept at a desired temperatures by means of techniques known per se, such as the hot oil technique.

The roll forming step may additionally comprise moulding the surface structure of the profile at desired locations of the cross-section of the profile, such as surface profiling that improves the grip to disposable cutlery.

The roll-formed profile may, if needed, be cooled down as a step immediately following roll forming or as part of roll forming, if the material flow has been preheated or if the hot pressing technique has been applied, and if the desired action of the binding agent possibly used requires cooling down to ensure the dimensional stability of the profile. Cooling may make use of techniques known per se, such as cold air blowing or chill rolls.

The novelty and technical effect of the method according to the disclosure are based on a blank (profile) manufactured by roll forming and having a desired cross-sectional profile, from which end products manufactured are cut off from defined places of the blank (profile) with the geometry that the manufactured products require. The combination of the roll forming step and the subsequent cutting of products to the desired shape allows an economical and efficient manufacture of products with the desired total geometry by means of an efficient mass production method.

Cutting products off the blank may be carried out either in connection with roll forming, as integrated into the material flow or as a separate work stage as a postprocessing step of roll-formed blanks. As the cutting technique for cutting off products, various techniques may be used, such as mechanical cutting with a rotation punch or flatbed punch, waterjet cutting, or laser cutting.

BRIEF DESCRIPTION OF THE DRAWINGS

In the following, the disclosure is disclosed in closer detail with reference to the accompanying drawings, in which.

DETAILED DESCRIPTION

Figure 1:
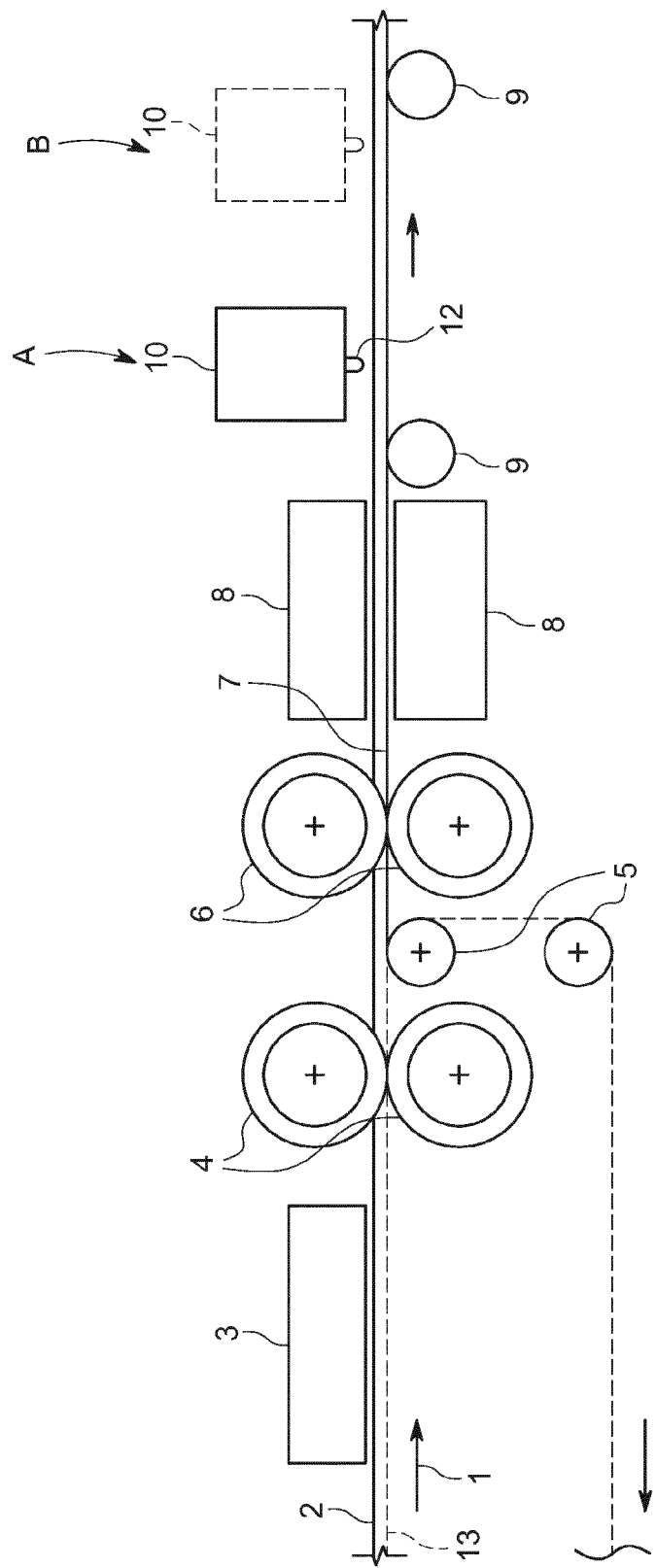
FIG. 1 shows a principled diagram of a manufacturing line used for the implementation of the method as a cross section.

In FIG. 1, a material flow 2 is fed, supported by a feed belt 13 shown with dotted lines, in the direction of the arrow 1 through nips of rollers 4 at the first step of roll forming. The material may be heated before the first roll forming step to a temperature required by the action of a binding agent, by means of a radiant heater 3, for example. Alternatively (or additionally), the roll forming drums may be used for heating the material (by making use of the hot oil technique, known per se, for example). The profiled material flow formed at the first roll forming step is led to a second roll forming step to the nip of rollers 6, in which the profile is moulded to its final shape. The feed belt 13 is guided to a return route through deflector rolls 5. The roll-formed profile 7 is led through cooling elements 8 to a cutting step, at which products of a desired shape are cut off the profile by laser cutting, for example. In the exemplary solution of FIG. 1, a laser cutting unit 10 is integrated to operate in connection with continuous profile manufacture, and the laser cutting unit is programmed to operate in the area between positions A and B in the figure. Advantageously, the laser cutting unit 10 has a plurality of parallel cutting nozzles 12 to guarantee a required production capacity. During the cooling and cutting step, the profile is supported by means of support rollers 9 shown in the figure, for example.

Figure 2:
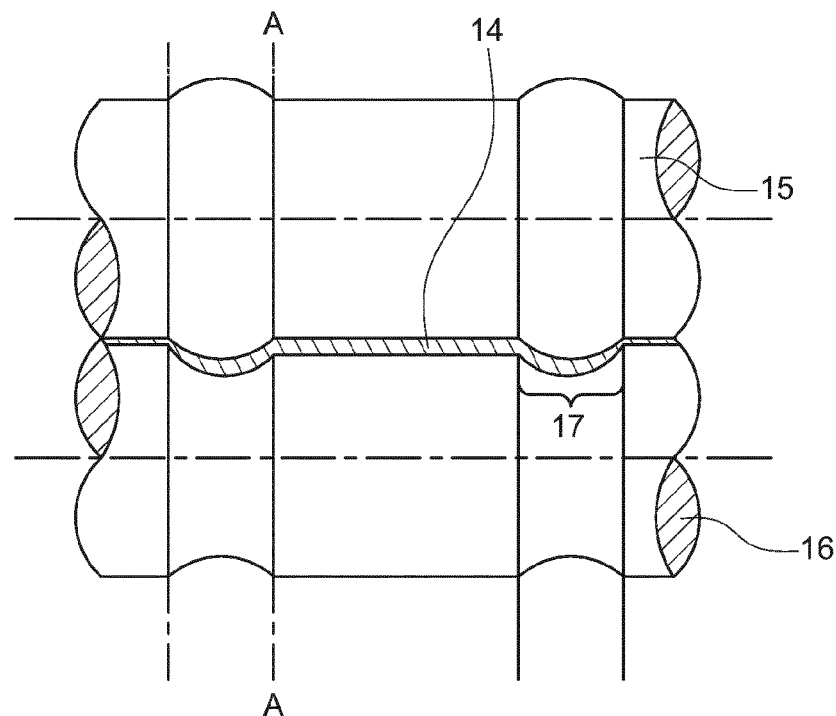
FIG. 2 shows a cross section of a blank used for manufacturing disposable forks, profiled at the roll forming step of the method between roll forming drums.

FIG. 2 shows a cross-section of a blank 14 profiled at the roll forming step for the manufacture of disposable forks, in the nip between roll forming drums 15 and 16. The roll forming drums are so shaped that the desired form for the tine part 17 of the forks, to be cut off the blank 14, is obtained. The line A-A in the figure describes the alignment on the blank 14 of cutting off products at the subsequent manufacturing step.

Figure 3:
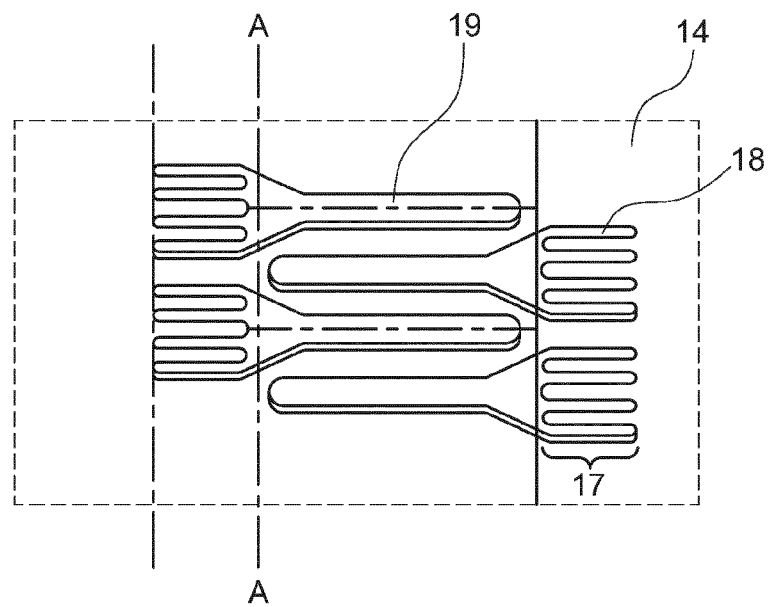
FIG. 3 shows the blank of FIG. 2 as a plane figure, and principled positioning and alignment of forks in the blank, to be cut off the blank.

FIG. 3 shows a part of the blank 14 according to FIG. 2 as a plane figure, and the principled positioning and alignment of the cutting geometry 18 of disposable forks 19 to be cut off the blank 14. The line A-A in the figure refers to the corresponding line in the previous FIG. 2, and illustrates the performed alignment on the blank 14 for cutting off products.

Figure 4:
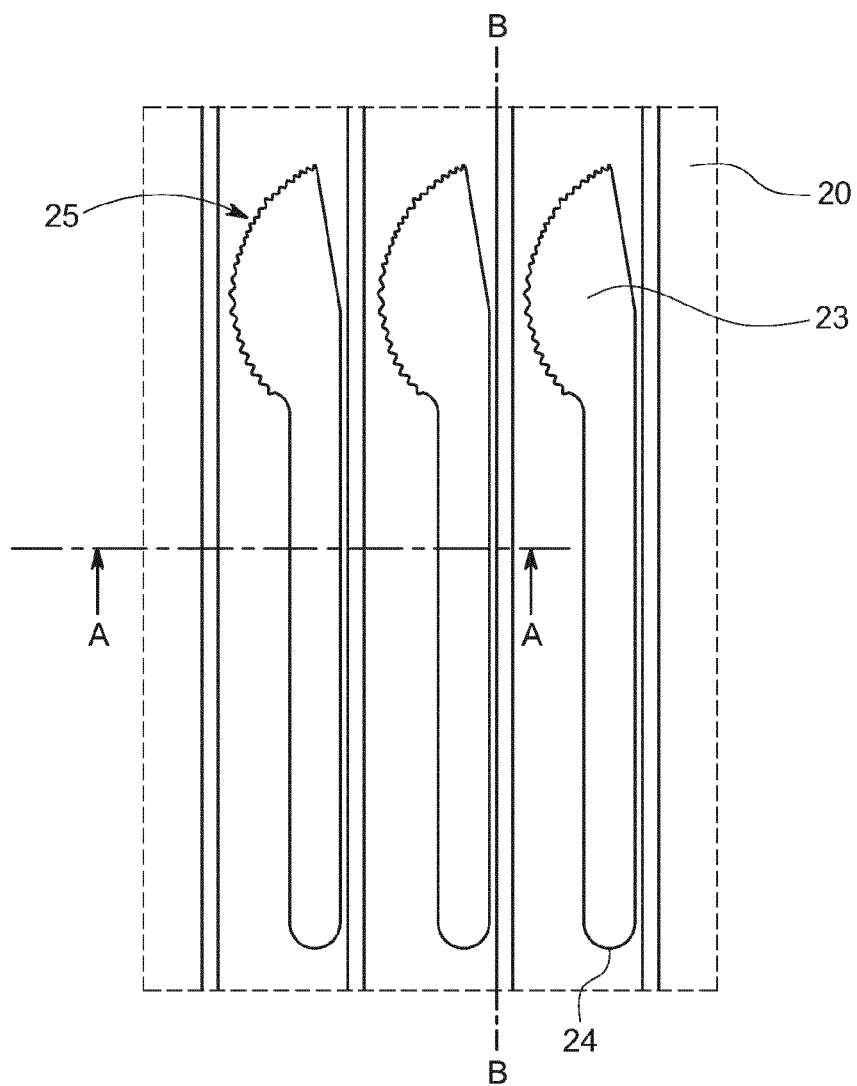
FIG. 4 shows a plane figure of a blank roll-formed for the manufacture of disposable knives by the method of the disclosure and positioning the cutting geometry of the products on the blank.
Figure 5:
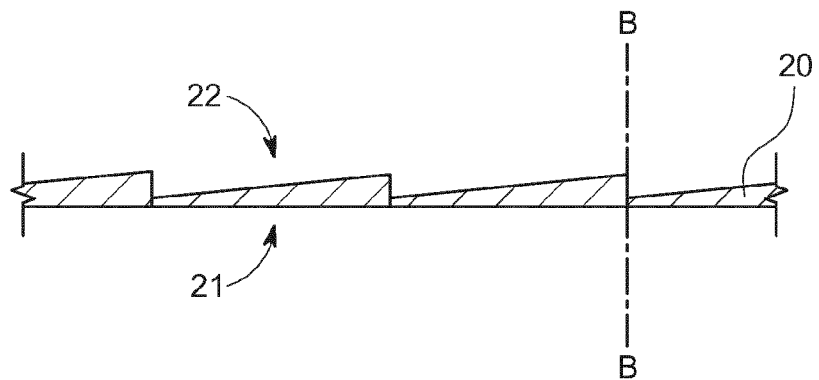
FIG. 5 shows a partial cross-section A-A of the blank according to FIG. 4.

FIGS. 4 and 5 show, as an example, part of a roll-formed blank 20 relating to the manufacture of disposable knives, and positioning products 23 to be cut off the blank as well as aligning the cutting geometry 24 on the blank. FIG. 5 shows part of the cross-section A-A of the blank 20 in FIG. 4, as well as the location of the alignment line B-B shown in FIG. 4 in the cross section. The saw-toothed geometry of the blade part 25 cutting off the products for improving the cutting efficiency of the knives is accomplished at cutting off the products. The blank profile shown in FIG. 5 is advantageously so implemented that the bottom surface 21 of the blank is moulded with a cylindrical flatbed drum, and the top surface of the profile is moulded by a drum machined in the form required by the profile.

Figure 6:
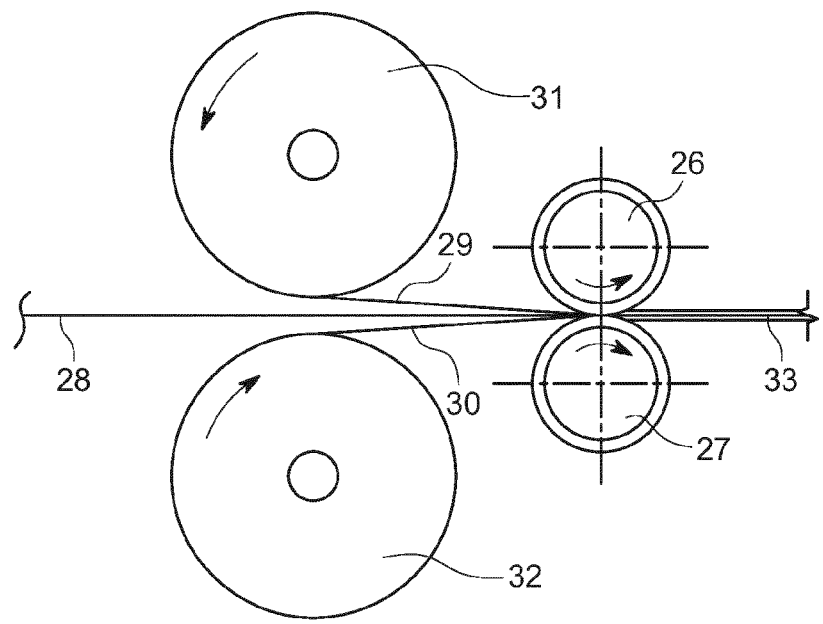
FIG. 6 shows a principled drawing of a feeding solution of the method according to the disclosure for a material flow, in which three separate material layers are fed to a roll forming step, which are bound into a coherent profile at the roll forming step.

FIG. 6 shows a principled solution for feeding in material to the roll forming step, in which the material to be roll-formed consists of a plurality of separate material layers having different characteristics. Into the nip between the roll forming drums 26 and 27, a band 28 of the profile being formed is fed as a centre layer, and bands 29 and 30 as the surface layers from the rolls 31 and 32. Powerful mechanical pressing, binding agent characteristics of the material layers, and thermal processing, if needed, at the roll forming step cause the different material layers to bind into each other as a coherent profile 33 with the desired characteristics and cross-sectional form.

Figure 7:
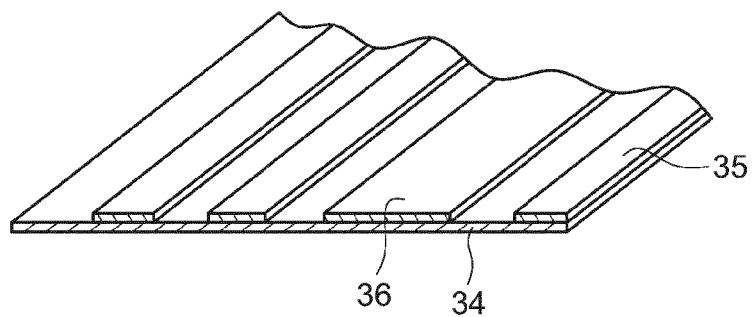
FIG. 7 shows a principled drawing of the structure and cross section of a material flow fed into a roll forming step of the method, in which cross-section of the material flow fed to the roll forming step differs from a material flow of equal thickness.

FIG. 7 shows a solution of feeding in material, by means of which it is possible to implement at the roll forming step greater differences in material thickness desired in the cross section of the profile at different places thereof. The figures show the cross section of the material flow fed in as well as an axonometric view of the material flow fed in. In the solution according to FIG. 7, in connection with a wide material band 34, narrower material bands 35 and 36 having different thicknesses are fed to the roll forming step at the desired places of the profile cross-section.

The use and technical applicability of the disclosure are not restricted to the aforedescribed exemplary solution of the products or shapes of different profiles. It is additionally possible to combine and vary different feeding solutions of the material flow fed to the roll forming step within the scope of the options disclosed in the above and of prior art.

In the method, the material requirements, moulding of the roll forming rollers, and the number of the drum pairs needed in roll forming are defined product-specifically.

The invention claimed is:

1. A method for manufacturing plastic-free products, the method comprising:
   feeding raw fibrous material including fibers as a material flow, wherein the raw fibrous material is a cellulose fiber material containing cellulose fibers and a binding agent, the binding agent being a natural substance, and wherein the feeding of the raw fibrous material includes feeding the fibrous material as a combination of a plurality of material bands;
   roll forming the material flow including binding the fibers of the fed raw fibrous material into a coherent profile, and molding a cross-sectional profile of the profile into a blank with a desired cross-sectional profile by displacing the coherent profile between at least one roller pair or drum pair to form molded profiles of the plastic-free products, wherein the roll forming comprises pressing the material flow of raw fibrous material between successive ones of the at least one roller pair or drum pair, wherein the plurality of material bands are bound into each other during the roll forming;
   cutting products of a desired shape from the molded blank by aligning a cutting geometry of the products at a desired place on the blank and cutting the molded blank along an entire outline of each of the plastic-free products, each entire outline fully enclosing a corresponding one of the molded profiles,
   wherein the roll forming is implemented as hot pressing whereby the rollers or drums used in roll forming are heated and kept at a desired temperature during the molding,
   wherein the roll forming implemented as hot pressing comprises molding a surface structure of the profile at desired locations of the cross-section of the profile,
   wherein the method is free of any molding step that is performed both downstream of the roll forming and upstream of the cutting.

2. The method as claimed in claim 1, wherein the successive ones of the at least one roller pair or drum pair are manufactured in a desired form, and the material flow is pressed to a desired material density and to the desired cross-sectional profile.

3. The method as claimed in claim 1, further comprising thermally or chemically pre-processing the material flow prior to roll forming.

4. The method as claimed in claim 1, further comprising cooling following the roll forming.

5. The method as claimed in claim 1, wherein the cutting is carried out by mechanical cutting with a rotation punch or a flatbed punch, or with waterjet cutting, or with laser cutting.

6. The method as claimed in claim 1, wherein the cutting is performed together with the roll forming.

7. The method as claimed in claim 1, wherein the natural substance is starch or lignin.

8. The method as claimed in claim 1, wherein, prior to the roll forming, the material flow has a varying material thickness.

9. The method as claimed in claim 1, wherein the material flow, prior to the roll forming, includes superimposed layers having different widths and resulting nonoverlapping regions, such that the material flow, at the outset of the roll forming, includes material bands with varying material thicknesses.

* * * * *